Patented Dec. 11, 1945

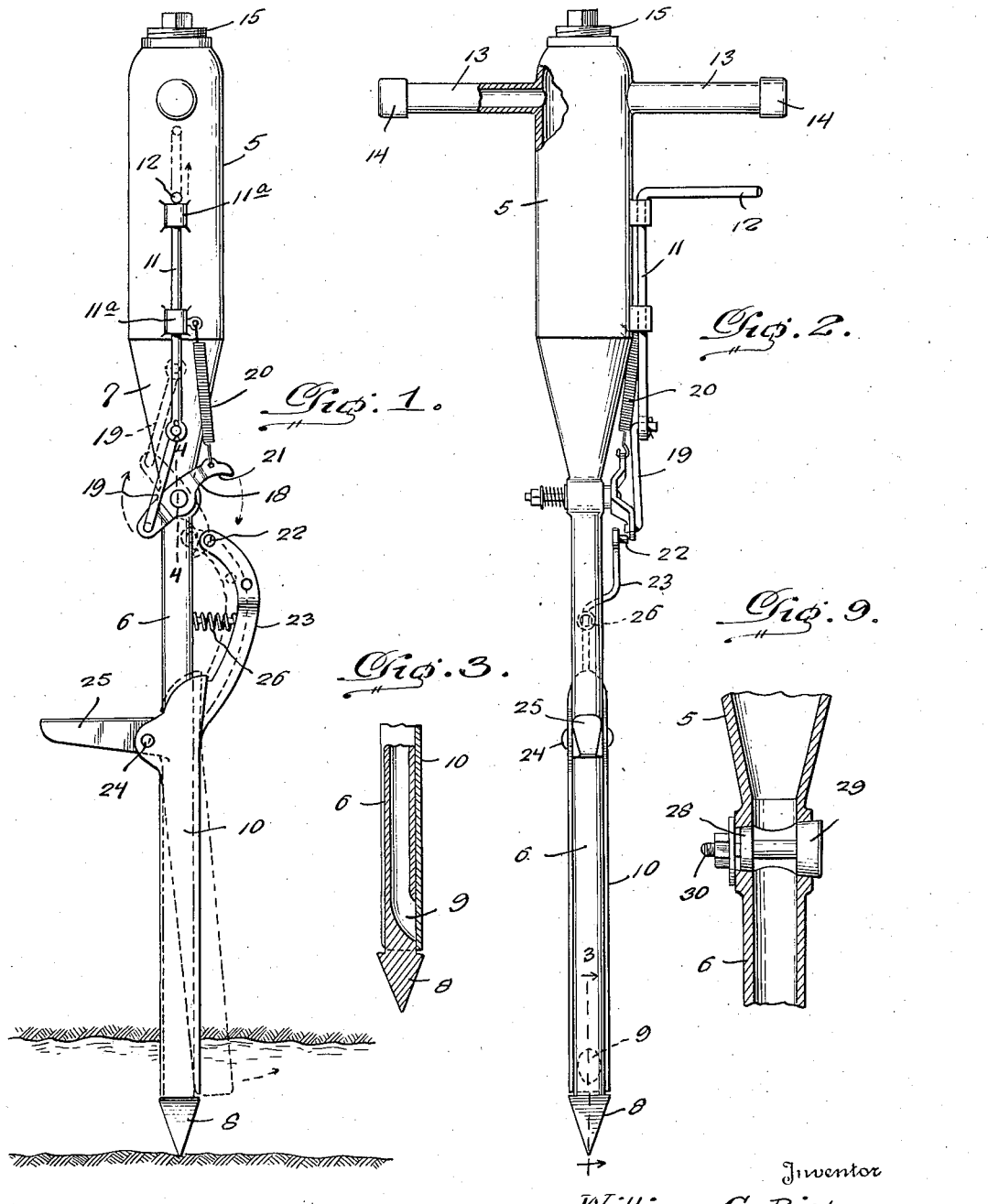

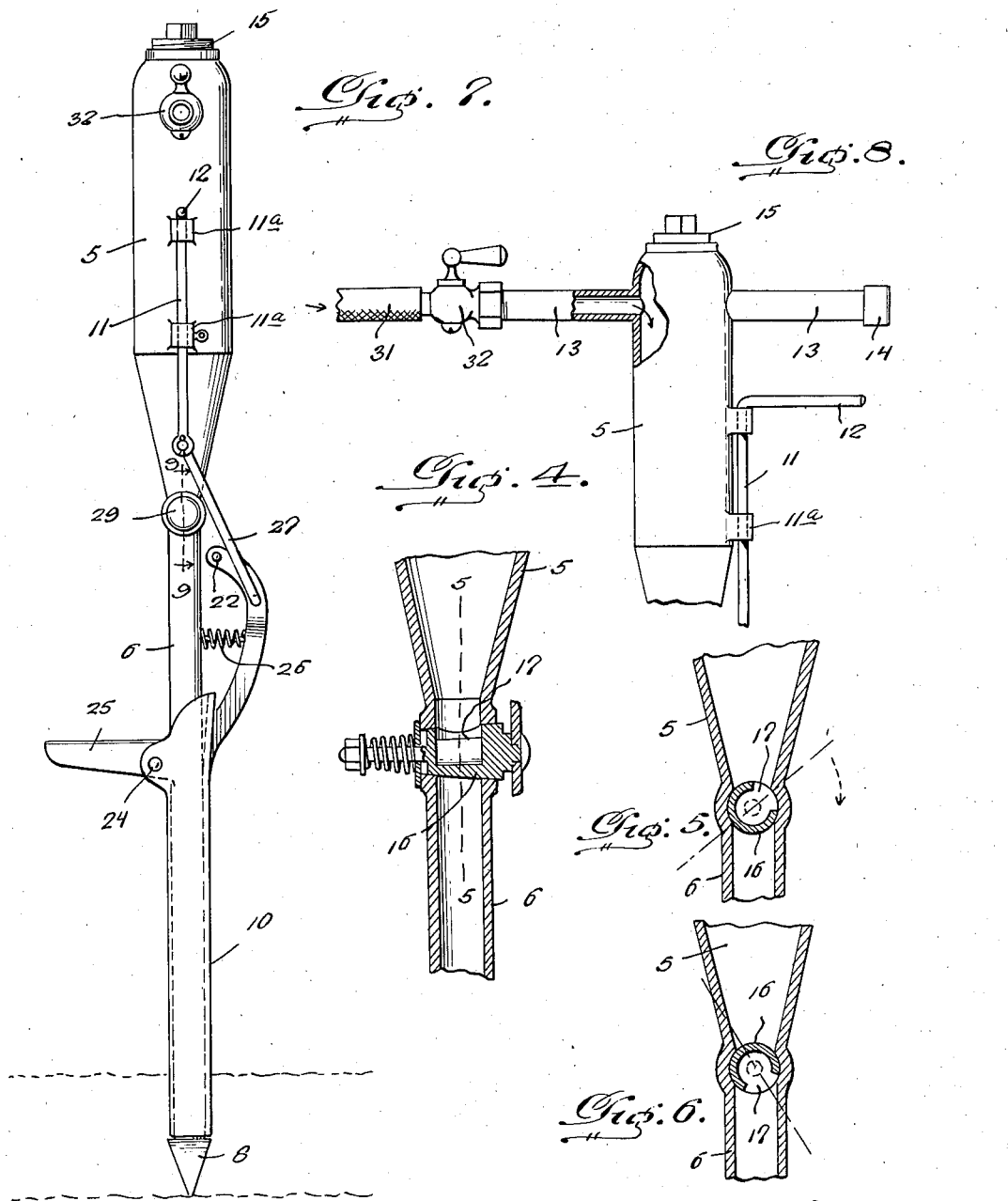

2,390,686

UNITED STATES PATENT OFFICE 2,390,686

RODENT EXTERMINATOR

William C. Bishop, Vernon, Tex., assignor of one-half to George W. Lisenbee, Vernon, Tex.

Application May 6, 1943, Serial No. 485,939

2 Claims. (Cl. 111—95)

This invention relates to rodent exterminators of that type adapted to introduce poison material into the underground runways of the rodents.

The primary object of the present invention is to provide a device of the above kind which is relatively simple and durable in construction, easy to use, and highly efficient in use.

The present device embodies a portable instrument including a vertical elongated cylinder constituting a container or reservoir for the poison material and having means to facilitate the introduction of such material into the same, a rigid slender tubular outlet pipe depending from the bottom of said cylinder and having a solid pointed lower end adapted to penetrate the ground and a lateral outlet opening for the poison material immediately above said pointed lower end, a movable shield normally embracing said outlet pipe and closing said outlet opening, means including a vertically slidable operating rod mounted at one side of the cylinder for moving said shield to uncover the outlet opening and permit the poison material to flow from the outlet pipe into the runway of the rodents, and a cross bar handle at the top of said cylinder to facilitate forcing of the pointed end of the outlet pipe into the ground until the outlet opening reaches said runway.

One embodiment of the present invention is adapted to introduce granular poison material into the runways of rodents and has a rotary measuring valve to control the flow of the material from the cylinder to the outlet pipe, means being provided to operatively connect the operating rod with said valve so that a measured quantity of the material is fed to the outlet pipe each time the shield is operated to uncover the outlet opening.

In another embodiment, an arm of the cross bar handle is tubular and communicates with the cylinder, and valve-controlled means is provided to connect said arm with a source of supply of poison gas under pressure, whereby such gas may constitute the material introduced into the runway of the rodents.

The present invention embodies certain other features and details that will be apparent from the following description when considered in connection with the accompanying drawings, in which:

Figure 1 is an elevational view of an embodiment of the present invention which is adapted to introduce granular poison material into the runways of rodents.

Figure 2 is an elevation, partly broken away and in section, looking toward the right of Figure 1.

Figure 3 is a fragmentary section taken on line 3—3 of Figure 2.

Figure 4 is an enlarged fragmentary section taken on line 4—4 of Figure 1.

Figure 5 is a section on line 5—5 of Figure 4.

Figure 6 is a view similar to Figure 5 with the measuring valve turned to deposit its contents into the outlet pipe.

Figure 7 is a view similar to Figure 1, of another embodiment of the present invention, which is adapted to introduce poison gas into the rodent runways.

Figure 8 is an elevational view, partly broken away and in section, of the upper portion of the device shown in Figure 7, as seen looking to the left of the latter figure; and Figure 9 is a fragmentary section taken on line 9—9 of Figure 7.

Referring in detail to the drawings, the present invention includes a vertical elongated cylinder 5 constituting a reservoir for poison material, a rigid slender tubular outlet pipe 6 depending from the tapered bottom portion 7 of said cylinder and having a solid pointed lower end 8 adapted to penetrate the ground and a lateral outlet opening 9 immediately above said pointed end 8. The pointed end 8 is preferably of pyramidal form to promote its penetration of the ground, and a movable channel-shaped shield 10 normally embraces the outlet pipe 6 and closes the outlet opening 9 as shown in Figure 3. Means including a vertically slidable operating rod 11 mounted in guides 11a and having a lateral handle 12 at its upper end, is provided to move the shield 10 for uncovering the outlet opening 9 and permitting the poison material to flow from the outlet pipe 6 into the rodent runway. A cross bar handle embodying tubular arms 13 closed at the ends by caps 14 and communicating with cylinder 5, is provided at the top of said cylinder to facilitate forcing of the lower end of outlet pipe 6 into the ground until the outlet opening 9 reaches the rodent runway.

In the embodiment of Figures 1 to 6 inclusive, the cylinder 5 is adapted to receive a supply of granular poison material, and has a top filler opening closed by a removable plug 15. Also, a rotary measuring valve 16 is provided to control the supply of poison material from the cylinder 5 to outlet pipe 6. This valve is a hollow turn-plug open at one side as at 17 and normally positioned as shown in Figures 4 and 5 to receive the poison material from cylinder 5. A cross-bar lever 18 is fixed on the stem of valve 16 and has one arm connected to the lower end of rod 11 by means of a link 19, a tension spring 20 being provided to actuate lever 18 and normally position the valve 16 as shown in Figures 4 and 5. The other arm of lever 18 is hook-shaped as at 21 and arranged to engage a lateral pin 22 on the upper end of a lever 23 rigid with and rising from the shield 10, when the rod 11 is pulled upwardly to turn the valve 16 to the position of Figure 6. Shield 10 is pivoted at 24 to an arm 25 rigid with and projecting laterally from outlet pipe 6, compression spring 26 being interposed between lever 23 and pipe 6 to normally swing the shield 10 into embracing relation to pipe 6 wherein it closes outlet opening 9. The arrangement is such that when the rod 11 is pulled upwardly, valve 16 is turned to discharge its contents into pipe 6, and hooked arm 21 engages pin 22 to operate lever 23 and swing the shield 10 outwardly as shown by dotted lines in Figure 1 to uncover opening 9 and permit said contents or supply of poison material to flow into the rodent runway. As soon as the rod 11 is released, the parts return to the normal positions thereof as shown by full lines in Figure 1 under the influence of springs 20 and 26. Arm 25 may be actuated by the foot, while pressing downwardly on handle arms 13, to assist in forcing the pointed end 8 into the ground.

In the embodiment of Figures 7 to 9 inclusive, the spring 20, link 19, valve 16, and lever 18 are omitted, the lower end of rod 11 being directly connected with lever 23 by a link 27, the openings in the sides of the lower end of cylinder 5 which accommodate the ends of valve 16 being closed by plugs 28 and 29 bolted in place as at 30. Also, a cap 14 is removed from one of the handle arms 13, and conduit means 31 having a control valve 32 is provided to connect this arm 13 with a source of supply of poison gas under pressure, such as the exhaust of an internal combustion engine. By opening valve 32, and operating rod 11 to move shield 10 so as to uncover opening 9, the poison gas introduced into cylinder 5 may be released into the rodent runway. Parts which are similar in both illustrated embodiments of the invention are indicated by like reference characters, and it will be apparent that one instrument may be converted for using either granular poison material or poison gas, as desired, or devices may be specially constructed for using either material desired.

What I claim is:

1. A rodent exterminator comprising a vertical elongated cylinder having means to facilitate the introduction of poison material into the sense, a slender outlet pipe rigid with and depending from the bottom of said cylinder, said outlet pipe having a solid pointed lower end adapted to penetrate the ground and provided with a lateral outlet opening immediately above said pointed end, a movable channel-shaped shield normally embracing said outlet pipe above the pointed end and closing said lateral outlet opening, a lateral arm rigid with said outlet pipe and operable by the foot to assist in forcing the pointed end of the outlet pipe into the ground, said shield being pivoted to said arm and having a longitudinally curved lever rigid with and rising therefrom, said lever curving outwardly from the shield and then inwardly toward the outlet pipe, an operating rod vertically slidable on said cylinder, an operated member connected to said operating rod and arranged to actuate said lever, and a spring interposed between said lever and said outlet pipe for normally swinging the shield to the position wherein the same embraces the outlet pipe and closes the outlet opening.

2. The construction defined in claim 1, in combination with a rotary measuring valve controlling the supply of poison material from the cylinder to the outlet pipe and having a stem, and a lateral pin on the upper end of said lever, said operated member comprising a cross bar lever fixed on the valve stem and having an arm arranged to engage the lateral pin and swing the shield so as to uncover the outlet opening when the valve is turned to discharge its contents into the outlet pipe.

WILLIAM C. BISHOP.